United States Patent
Rothenberg et al.

(10) Patent No.: US 7,468,832 B2
(45) Date of Patent: Dec. 23, 2008

(54) METHOD AND SYSTEM FOR COHERENT BEAM COMBINING USING AN INTEGRATED DIFFRACTIVE BEAM COMBINER AND SAMPLER

(75) Inventors: Joshua E. Rothenberg, Los Angeles, CA (US); Robert R. Rice, Simi Valley, CA (US); Michael G. Wickham, Rancho Palos Verdes, CA (US); Hiroshi Komine, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 66 days.

(21) Appl. No.: 11/543,677

(22) Filed: Oct. 5, 2006

(65) Prior Publication Data

US 2008/0084598 A1    Apr. 10, 2008

(51) Int. Cl.
*H04B 10/17* (2006.01)
*G01B 9/00* (2006.01)

(52) U.S. Cl. .............................. 359/341.41; 372/29.016; 356/477

(58) Field of Classification Search ............... 359/341.1; 372/29.016; 356/477
See application file for complete search history.

(56) References Cited

U.S. PATENT DOCUMENTS

| | | | |
|---|---|---|---|
| 6,192,062 B1 | 2/2001 | Sanchez-Rubio et al. | |
| 6,208,679 B1 | 3/2001 | Sanchez-Rubio et al. | |
| 6,327,292 B1 | 12/2001 | Sanchez-Rubio et al. | |
| 6,366,356 B1 | 4/2002 | Brosnan et al. | |
| 6,697,192 B1 | 2/2004 | Fan et al. | |
| 6,708,003 B1 * | 3/2004 | Wickham et al. | 398/102 |
| 7,199,924 B1 * | 4/2007 | Brown et al. | 359/556 |
| 7,233,442 B1 * | 6/2007 | Brown et al. | 359/556 |

OTHER PUBLICATIONS

Shay, T.M. & Benham, V. "First Experimental Demonstration of Phase Locking of Optical Fiber Arrays by RF Phase Modulation". *Proceedings of SPIE* vol. 5550. pp. 313-319 (2004).

* cited by examiner

*Primary Examiner*—Eric Bolda

(57) ABSTRACT

A system and method for combining plural low power light beams into a coherent high power light beam by means of a diffractive optical element operating as both a beam combiner and beam sampler. An oscillation source transmits a master signal that is split into plural beams propagating at a common wavelength. Each beam is phase locked by a corresponding phase modulator according to a phase correction signal. The beams are directed through a fiber array to the diffractive optical element to allow efficient coherent combination of the beams at a desired diffraction order. The diffractive optical element includes a periodic sampling grating for diffracting a low power sample beam representative of the combined beam. A phase detection stage detects phases of constituent beams in the sample beam from which the phase correction signals are derived and fed back to the phase modulators. The diffractive optical element may be further modified to collimate beams diverging from the fiber array and to focus the sample beam onto a phase detector.

20 Claims, 9 Drawing Sheets

METHOD AND SYSTEM FOR COHERENT BEAM COMBINING USING AN INTEGRATED DIFFRACTIVE BEAM COMBINER AND SAMPLER

This application is related to U.S. patent application Ser. No. 11/361,352 filed Feb. 24, 2006; U.S. patent application Ser. No. 7,440,174, a.k.a. Snell & Wilmer entitled "Method and System For Diffractive Beam Combining Using DOE Combiner With Passive Phase Control" filed concurrently herewith; U.S. patent application Ser. No. 11/543,596, a.k.a. Snell & Wilmer entitled "Method and System For Hybrid Coherent And Incoherent Diffractive Beam Combining" filed concurrently herewith; and U.S. patent application Ser. No. 11/543,567, a.k.a. Snell & Wilmer entitled "Multi-Stage Method and System For Coherent Diffractive Beam Combining" filed concurrently herewith; all of which are fully incorporated herein by reference.

BACKGROUND OF THE INVENTION

1. Field of the Invention

The present invention relates to combining coherent light beams using active phasing. More specifically, the invention relates to combining high power lasers into a single coherent beam using a diffractive optical element that diffracts a low power sample of combined beams for use in active phasing.

2. Description of Related Art

High power lasers have many possible applications. In a military application, sufficient energy focused in a laser beam can provide an effective defensive countermeasure against ballistic projectiles. In a commercial application, a high power laser can be used to weld metal components that are too thick to be welded by conventional methods. To improve the effectiveness of the laser in any of these applications, the power transmitted by the beam may be enhanced by focusing the beam to its far-field diffraction limit, i.e., into as small an area as theoretically possible. A laser beam focused to this theoretical limit is said to be diffraction limited. Generally speaking, advancement of the art of high power lasers is impeded by physical limitations encountered when attempting to achieve this limit.

Lasers by their nature are ideally diffraction limited, such that the smallest possible area of focus is limited by the product of the focal distance and the diffraction limited angle, which is the wavelength of the light divided by the aperture width. Thus, the larger the aperture, the tighter the focus. However, there are practical limitations on the size of an aperture that can be designed for any optical apparatus. Imperfections in the optics may cause degradations in the laser wavefront that affect the focus, and in high power applications, thermal variations contribute to the degradation. This limits the designer's ability to focus the beam, resulting in a focal spot somewhat greater than 1.0 times the diffraction limit (1.0×DL). Practically speaking, the designer's goal is to achieve a near-diffraction-limited laser (i.e., one that approaches 1.0×DL) that operates at as high a power level as possible.

At present, the most advanced near-diffraction-limited laser beams cannot deliver enough power per unit area to serve effectively in high-power applications. In one case, an optimized beam can deliver a 3 kW beam having a diffraction limit of nearly 1.0. In another case, an optimized beam can deliver a 10 to 12 kW beam that is about 1.5 times diffraction limited. An objective of ongoing research in this field is to design a laser generator that can deliver 100 kW or more in a near-diffraction-limited beam.

One method for increasing the power deliverable by lasers is to combine the power of many coherently phased beams of a common wavelength by arranging a plurality of optical fiber emitters in a two-dimensional array. A beam splitter may be placed at the output of the array to sample the constituent beams. Each of the sampled beams is directed to a phase sensor, and the measured error signals are provided to phase modulators in each beam to ensure all the beams have equal phase. However, even in the most tightly packed array, the 'fill factor' of the composite beam (ratio of the composite beam power to a beam that uniformly fills the entire array aperture and has equal peak intensity) is only about 70%, due to voids that occur between fibers and also to the Gaussian shape of each beam. The end result is a reduction in brightness by the fill factor ratio—the focused composite beam has a central peak intensity equal to the fill factor ratio times the maximum intensity possible with an ideal uniform beam, with the remaining power appearing in widely separated side lobes. In other words the composite beam has a shape dramatically different than that of the constituent beams, and as a result the composite does not focus as well as the constituents.

Another known method for combining beams is spectral combining, in which many incoherent beams, i.e. beams of different wavelengths, are superimposed. The beams are transmitted through a prism or grating that aligns the beams along a common path, creating, in essence, a singular beam of multiple colors. Thus the composite beam has a shape that is substantially identical to that of the constituent beams. While this technique therefore eliminates the fill factor problem associated with the two-dimensional array, other problems arise from using multiple wavelengths. For one, the complexity of the system increases as each wavelength requires a different oscillator. Furthermore, the propagation angle of each wavelength must be precisely adjusted such that its incidence on the grating is exact, otherwise the beams will misalign. More importantly, each wavelength may behave differently as the beam propagates through various media. Atmospheric absorption is a function of wavelength, therefore a spectrally combined beam directed through air is more susceptible to energy loss than a single-wavelength selected for optimal transmission efficiency. Spectral combining has been proposed, for example, in U.S. Pat. No. 6,697,192, U.S. Pat. No. 6,327,292, U.S. Pat. No. 6,208,679, and U.S. Pat. No. 6,192,062.

Another proposed technique for increasing the power in a laser beam is to (coherently) combine, by constructive interference, a plurality of beams into a single coherent beam. This technique, known as coherent diffractive beam combining, is the subject of co-pending U.S. patent application Ser. No. 11/361,352 filed Feb. 24, 2006, which is incorporated by reference herein as though set forth in full. In general, the co-pending application teaches generating a plurality of input beams, all having a common wavelength, using a master oscillator. Each beam is individually amplified and transmitted through a fiber emitter, and the emitter outputs are combined into a single output beam using a diffractive optical element (DOE).

The technique includes a means for actively controlling the phases of the multiple beams using feedback to optimize the efficiency of the beam combination. This may be accomplished by coupling a phase modulator to each input beam, and by coupling a phase detector to a sampling of the output beam. The sampling is obtained by placing a transmissive beam splitter in the output path that reflects a low power portion of the output to the phase detector. Using electronics, correction signals based on phase deviations detected at the output are fed back to the modulators. An exemplary means for effecting active phase control in this fashion is disclosed in U.S. Pat. No. 6,708,003, which is also fully incorporated herein by reference. Another active phase detection and control method has been demonstrated by T. M. Shay et al., Proceedings of the SPIE, Vol. 5550, pp 313-319 (2004), which is also fully incorporated herein by reference. An advantage of this approach is that, similar to SBC, the combined output beam has a shape that is substantially identical to the composite beams and therefore eliminates the fill factor reduction in the intensity of the focused coherent output beam. However, disadvantages occur when sampling the phases of the high power combined output beams. A high power beam passing through a transmissive beam splitter causes thermal distortion that affects the phase measurement accuracy and focusability of the output beam. Also in this method, a single detector is used to measure the phases of all the constituent beams. For a very large number of combined beams the accuracy of phase measurement becomes more difficult with a single detector.

SUMMARY OF THE INVENTION

The present invention is directed to improvements in coherent diffractive beam combining. A system or method according to the invention combines plural low power light beams into a coherent high power light beam by means of a multi-function diffractive optical element (DOE). The DOE functions as both a beam combiner and a beam sampler. An oscillation source or master oscillator transmits a master signal that is split into plural beams all propagating at a common wavelength and polarization. The phases of the beams are synchronized in a phase modulation stage, where a phase modulator corresponding to each beam adjusts the phase according to a phase correction signal. A dither signal or other encoded signal is also applied to each beam at this stage for phase detection purposes. The beams are directed through a one or two dimensional array of fiber emitters and collimated for incidence on the DOE, which is preferably a reflective optic. The DOE operates as a beam combiner to allow efficient coherent combination of the beams at a desired diffraction order. In one embodiment, the coherent output beam has a maximum intensity along the $0^{th}$ diffraction order and combines the constituent beams at an optimal combination efficiency greater than 96%. The DOE includes a periodic sampling grating for diffracting a low power sample beam having a distribution of diffraction order intensities representative of the distribution of diffraction order intensities of the high power coherent beam. A phase detection stage detects phases of constituent beams in the sample beam using known decoding techniques. A phase controller derives phase correction signals from the detected phases and feeds the phase correction signals back to the phase modulators. The DOE surface may be modified with a curved or kinoform shape to collimate beams diverging from the fiber array, or to focus the sample beam onto phase detectors in the phase detection stage.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DETAILED DESCRIPTION OF THE PREFERRED EMBODIMENTS

Coherent Diffractive Beam Combining

A coherent diffractive beam combining method has been described in co-pending U.S. patent application Ser. No. 11/361,352 by inventors of the present application. The entire disclosure thereof is incorporated herein by reference. In general, the diffractive beam combining method employs a DOE to enable the coherent combination of the output of a plurality of fiber amplifiers transmitting laser beams derived from a common oscillator. The beam combination method requires active phasing of the outputs from the fiber amplifiers to lock the phases of the output beams in order to optimize intensity of the composite beam by means of constructive interference.

Active phasing is achieved by placing a beam splitter in the path of the composite beam that is diffracted by the DOE. The beam splitter produces a low power sample of the composite beam, and the sample is focused onto a phase detector. In the phase detector, the output phase of each constituent beam is detected by decoding signals that are encoded on each constituent beam.

Using electronics, the phases are measured by comparison to reference signals from the master oscillator, and correction signals derived from this comparison are fed back to phase modulators in a low power section of each fiber amplifier to achieve optimal phasing.

Figure 1:
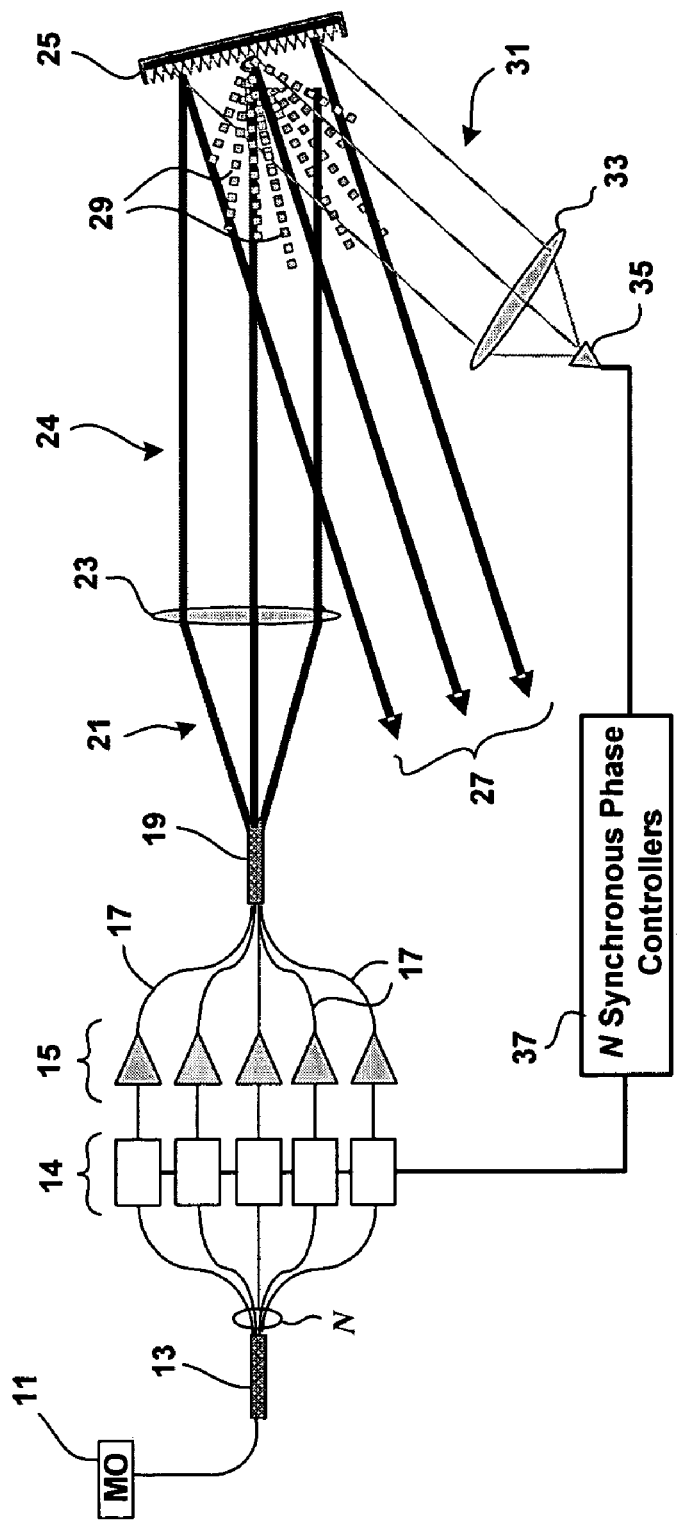
FIG. 1 is a block diagram of one embodiment of a system according to the invention employing a DOE combiner and sampler.

FIG. 1 shows a block diagram of one embodiment of a system according to the present invention. This system differs from the system shown and described in U.S. patent application Ser. No. 11/361,352 in that the present system employs a DOE that functions as both a beam combiner and a beam sampler. In this embodiment, a master oscillator 11 (MO) serves as an oscillation source for generating a master signal at a single wavelength. The master signal is split into N optical signals by a beam splitter 13 and transmitted to a phase modulation stage. At the phase modulation stage, each of the N optical signals is passed through a separate feedback dependent phase modulator 14. In one embodiment, one or more phase modulators 14 in the phase modulation stage may comprise a lithium niobate modulator.

The phase modulators 14 that comprise the phase modulation stage synchronize, or lock the phases of the N signals, each of which is then input to an optical amplifier 15. The output of each of N amplifiers 15 is coupled to a corresponding fiber emitter 17. This particular diagram shows five phase modulators 14 and optical amplifiers 15 corresponding to five fiber emitters 17, i.e. N has a value of 5. However, it should be appreciated that other embodiments are possible wherein N may assume any integer value.

Fiber emitters 17 are arranged in a one-dimensional or two-dimensional array 19, as desired. In one embodiment, fiber emitters 17 are selected to transmit beams of like polarization. Divergent light beams 21 emerging from array 19 are collimated by a collimating optic 23 and directed as an array of collimated beams 24 to DOE 25. The propagation angle and phase of each of the N beams emerging from array 19 is precisely set to ensure alignment along a selected diffraction order direction of DOE 25, such that the intensity of the composite output beam 27 of DOE 25 is maximized along a single diffraction order. In one embodiment, intensity of output beam 27 is maximized along the $0^{th}$ diffraction order. Some amount of spurious diffracted output beams 29 of minimal intensity also emerge from DOE 25.

DOE 25 further includes a means for diffracting a low power sample 31 of output beam 27. In one embodiment, the low power diffracting means may be a highly reflective layer with a weak grating (not shown) superimposed on the surface of DOE 25. The weak grating generates the desired coherent diffracted sample 31. Thus, DOE 25 may be a single optic with dual functions: combining plural input beams into a coherent output beam, and diffracting a low power sample of the coherent output.

The dual-function DOE 25 eliminates the need for placing a beam splitter in the output path to effect beam sampling. If a separate transmissive element such as a beam splitter is used for sampling, heat accumulating inside the element would tend to deform its optical characteristics.

This may lead to distortions in the output beam that render it less focusable.

Generally speaking, minimizing the number of elements in the optical circuit better enables the system to achieve the diffraction limit.

Due to differences in the lengths of fibers in array 19, and to variations caused by vibrations and temperature fluctuations, slight variations in phase may occur in each of the N beams 21 emerging from the array. A feedback control loop is provided to correct these variations and lock the phases of beams 21 to ensure maximum efficiency in a coherent output. In the feedback loop, sample beam 31 may be focused by an appropriate optic 33 (e.g. a lens or curved mirror) to direct sample beam 31 to a phase detection stage 35.

Phase detection stage 35 provides a means for detecting the phase of each of the N input beams that form output beam 27.

In one embodiment, encoded signals may be applied to each of the N optical signals at the phase modulation stage. Then, at stage 35, synchronous detection of the coded signals on each beam can be used to measure the output phase of each constituent beam. Ideally, N phase controllers 37 apply correction signals to lock N measured phases to a single uniform value.

However, systematic variations caused by the sampling optics or decoding electronics may require adjustment of each of the N phases to differing optimized values. These values can be determined by a calibration procedure that optimizes the combination efficiency of the N beams into a desired diffraction order. The phase controllers 37 compare the measured phases to these optimized reference values and derive correction signals based on the comparisons. The correction signals are fed back to phase modulators 14, which lock the phases of the N optical signals accordingly. Various known techniques for phase synchronization of optical signals (e.g. encoding using distinct dither frequencies, CDMA, TDMA, etc.) may be employed in the feedback loop without departing from the scope of the present invention.

Examples of such techniques are discussed in greater detail in U.S. patent application Ser. No. 11/361,352, U.S. Pat. No. 6,366,356, U.S. Pat. No. 6,708,003, and T. M. Shay et al., Proceedings of the SPIE, Vol. 5550, pp. 313-319 (2004). These techniques should be selected to allow the combined beams to be phased for maximum combination efficiency.

Figure 2:
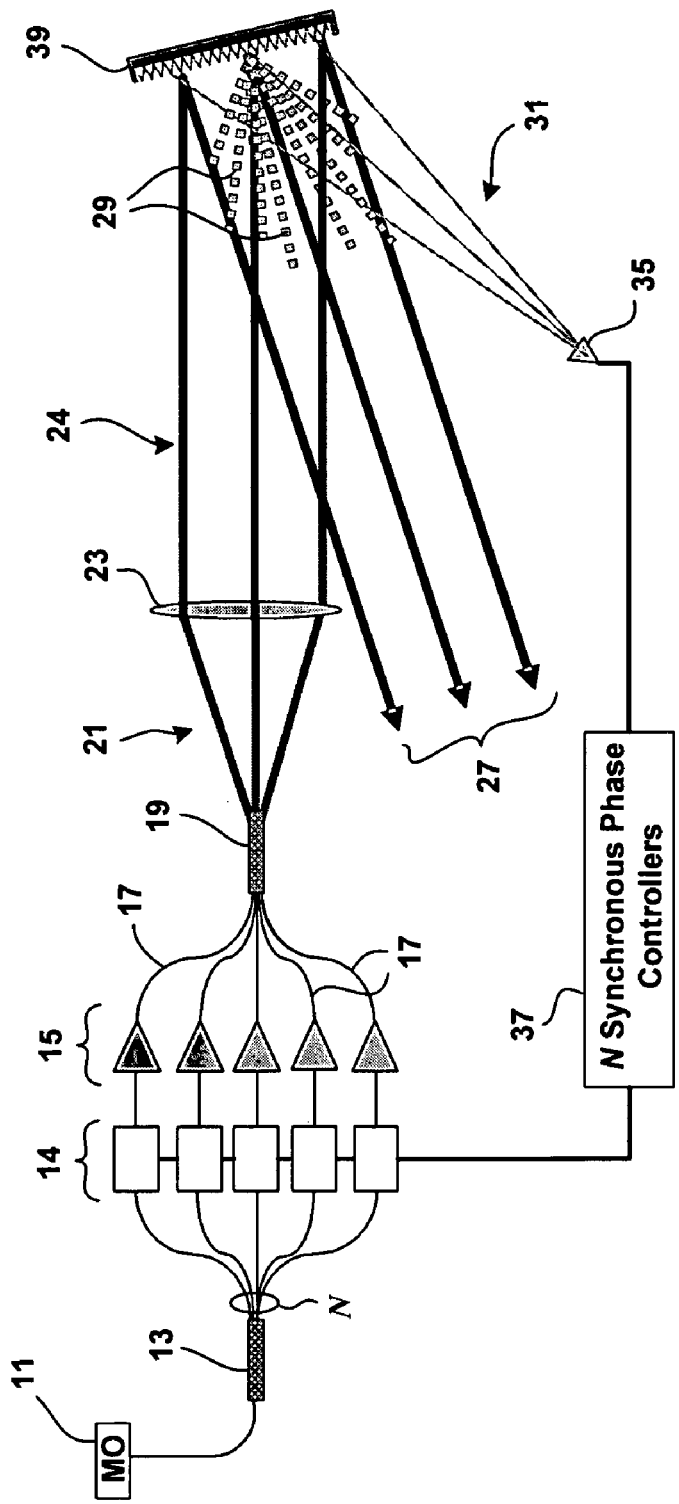
FIG. 2 is a block diagram of another embodiment of a system according to the invention in which a DOE includes a focusing element.

FIG. 2 illustrates another embodiment of a system for coherent beam combining according to the invention. This embodiment uses a DOE 39 that is further adapted to focus a sample beam 31 onto a phase detector 35. Thus, DOE 39 performs three functions: combining plural input beams into a coherent output beam, diffracting a low power sample of the coherent output, and focusing the sample beam. DOE 39 further simplifies the sampling optics by eliminating the need for placing a collimating optic 33 into the path of sample beam 31.

A DOE 39 may be fabricated, for example, by applying a more complex pattern of grooves rather than a simple grating of parallel grooves. The required grove pattern may be fabricated by conventional holography, wherein the grooves are formed by the interference of a point source at the desired location of focus and a plane wave. Alternately, conventional digital lithography can be used to generate the required pattern of grooves.

Figure 3:
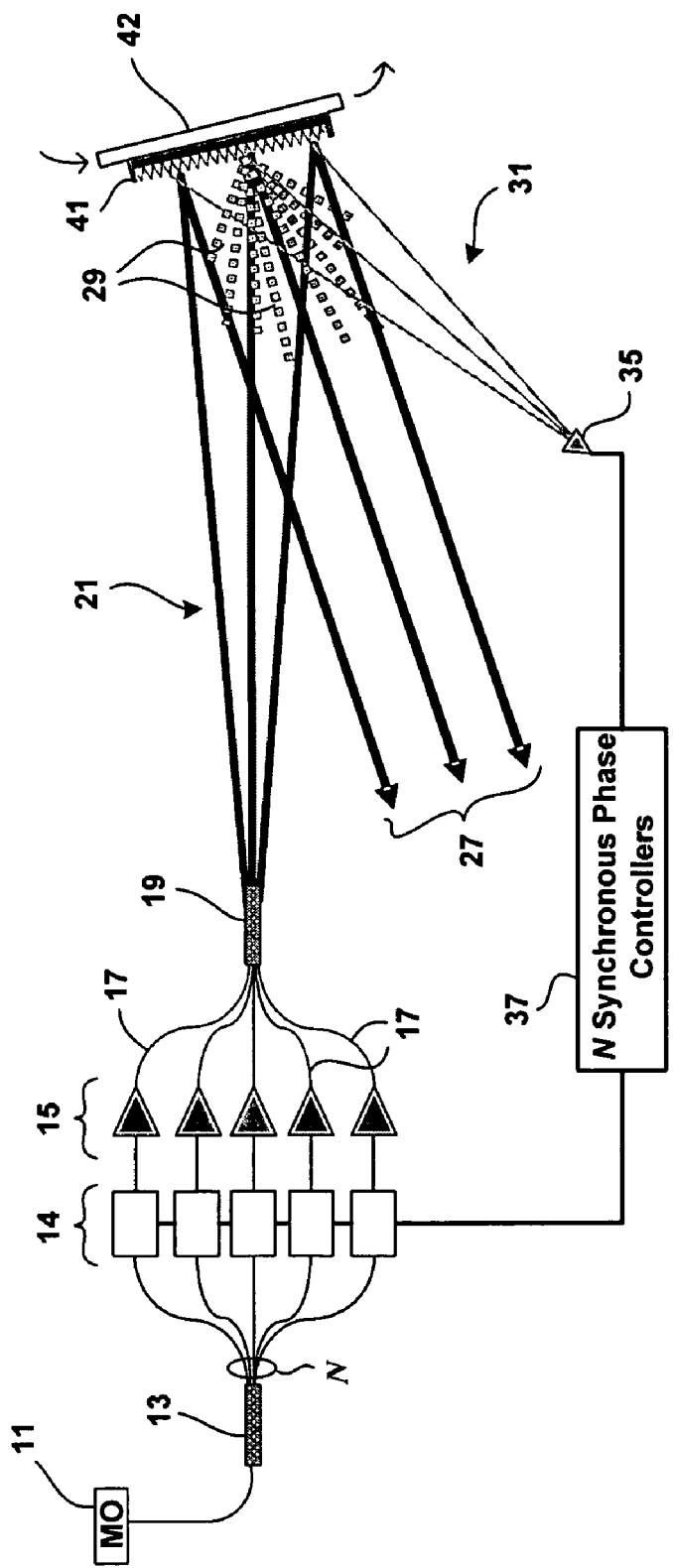
FIG. 3 is a block diagram of another embodiment of a system according to the invention in which a DOE includes a collimating element.

FIG. 3 illustrates another embodiment of a system for coherent beam combining according to the invention. This embodiment includes a multi-function DOE 41 that combines the functions of DOE 39 and collimator 23. Thus, in addition to performing the three functions of DOE 39, DOE 41 performs a fourth function of collimating the input beams 21. This eliminates collimating optic 23 from the system, as well as any distortion that may be introduced by that element.

One method for manufacturing a DOE 41 is to fabricate it on an appropriately curved substrate. Alternately, the DOE could be designed with an additional phase variation of a kinoform lens. As is well known in the art, the kinoform is a curved shape fabricated modulo phase of a multiple of $2\pi$.

Throughout the disclosure, the various DOEs depicted in the figures are modeled as primarily reflective optical elements. In one preferred embodiment, the DOE comprises a highly reflective dielectric stack on it surface having greater than 99% reflectivity to minimize power absorption.

Alternatively, any DOE described herein may be fabricated as a transmissive element. However, reflective elements are preferred primarily because the non-reflecting side of a reflective element may be configured for cooling without introducing material into the optical path. In the example of FIG. 3, DOE 41 is shown with an optional cooling means 42 abutting the non-reflecting side.

Cooling means 42 may be any type of heat sink suitable for removing heat from DOE 41 to ensure optical stability. For example, cooling means 42 may be a finned metal heat sink contacted to the DOE by an adhesive with high thermal conductivity, a surface exposed to forced air, a conduit for the flow of coolant such as water, or a combination of any of the foregoing.

Figure 4:
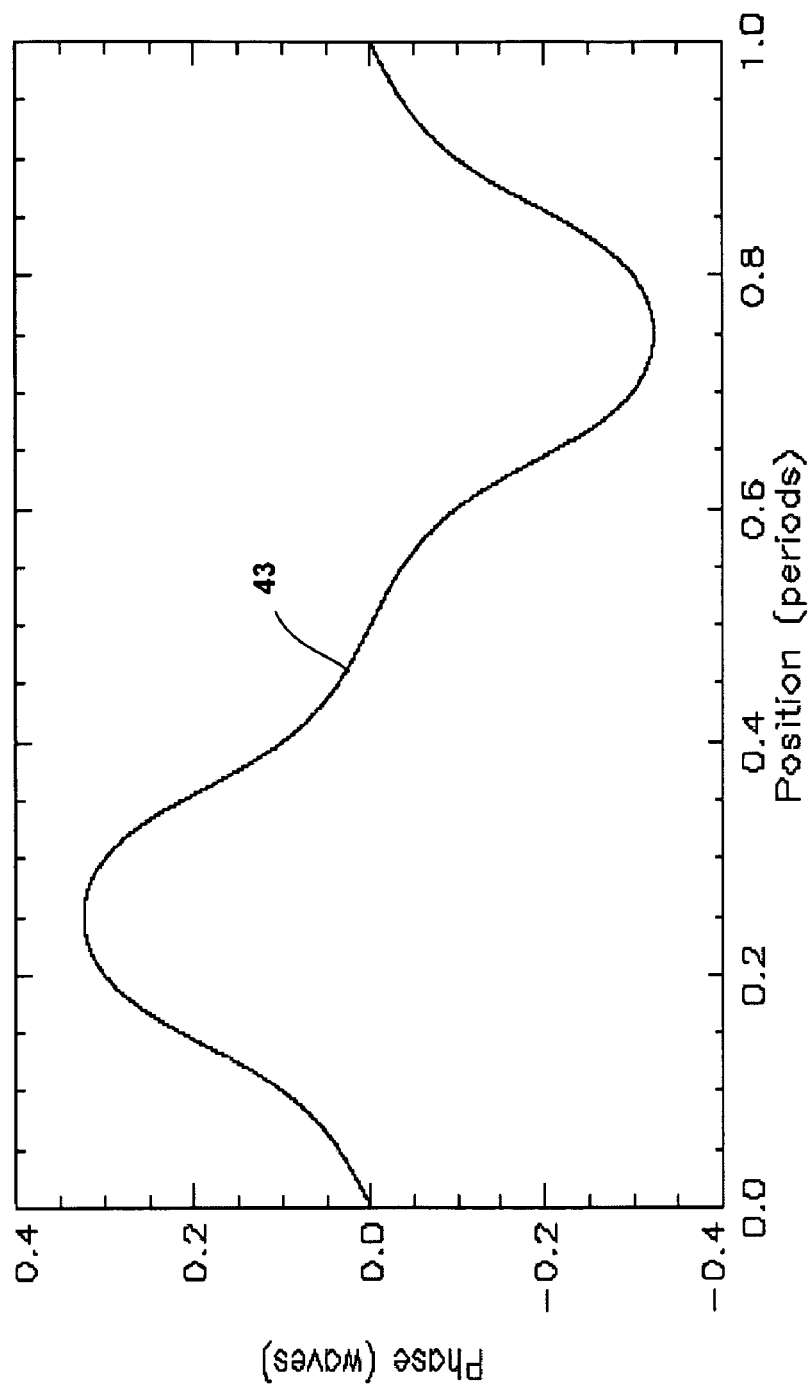
FIG. 4 is a plot of one example of a periodic phase pattern in a five-beam combiner DOE for splitting a single beam into five diffraction orders.
Figure 5:
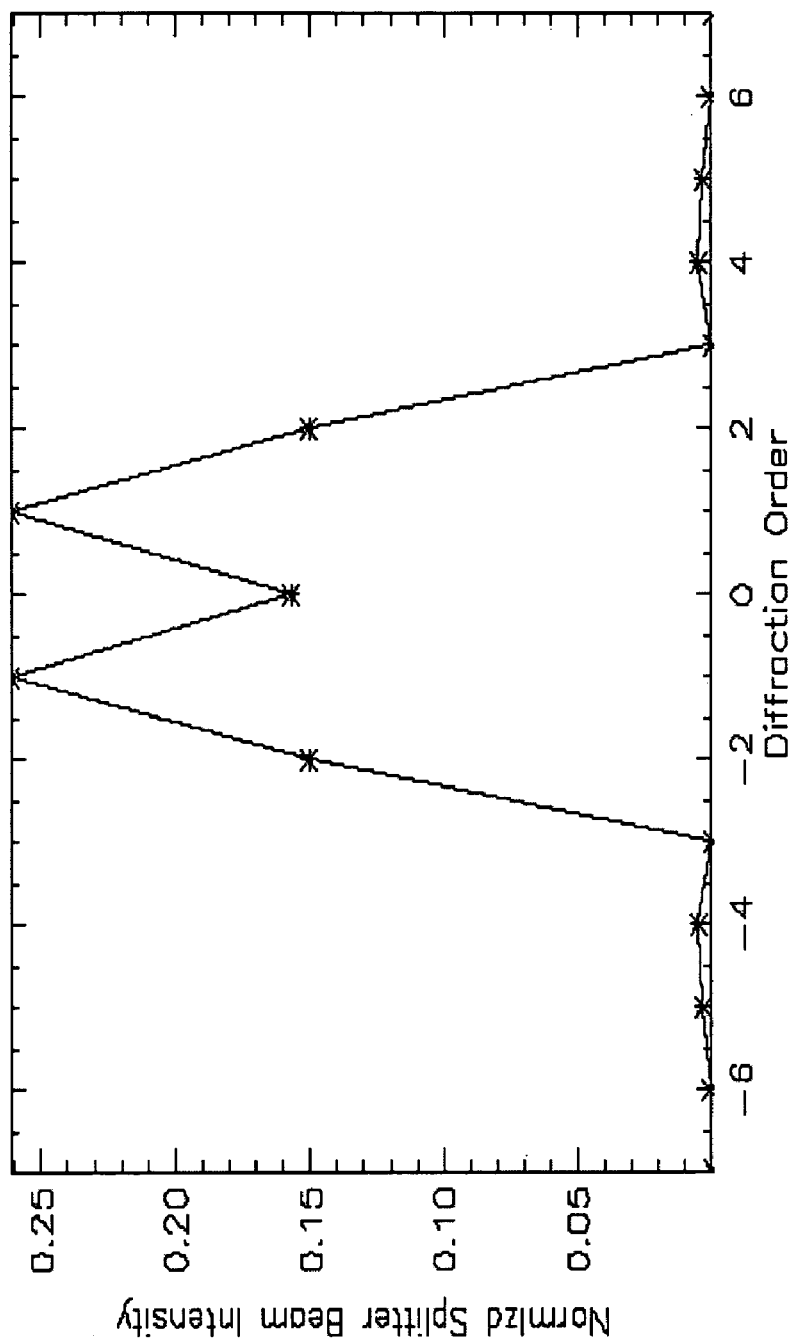
FIG. 5 is a plot showing normalized intensities of the five diffraction orders produced by the DOE of FIG. 4, when used as a beam splitter.

To further illustrate a DOE design appropriate for use in the foregoing embodiments, consider a simple DOE that splits a single beam into five diffracted beams in a 1D array. This simplified example is presented for illustration purposes only. DOEs can be designed to efficiently combine or split an arbitrarily large number of beams, in 1D or 2D arrays. The subject DOE has a pattern of parallel precisely-shaped main grooves etched on its surface, which upon reflection or transmission produces the 1D periodic phase pattern 43 plotted in FIG. 4 in waves (one wave equals $2\pi$ radians). For a reflective or transmissive DOE one wave of phase corresponds to an etch depth of $\lambda/2$ or $\lambda/(n-1)$, respectively, where n is the index of refraction of the DOE substrate and $\lambda$ is the wavelength. Thus, the pattern 43 corresponds to an appropriately scaled etch depth pattern on the DOE surface. If a single beam is incident on this DOE, approximately 98% of the power is split among five diffracted orders in a linear array. The remaining approximate 2% of power is distributed among spurious output beams diffracted at higher orders. A normalized plot of the distribution of the beam intensity among all diffracted orders is shown in FIG. 5. Note that the angles of the diffracted orders of the DOE are given by the usual grating equation. For an input beam at normal incidence to the DOE, the diffracted angle of the $m^{th}$ order is $$\sin \theta_m = m\lambda/P \quad (1)$$

where $\lambda$ is the wavelength and P is the period of the phase pattern on the DOE.

Figure 6:
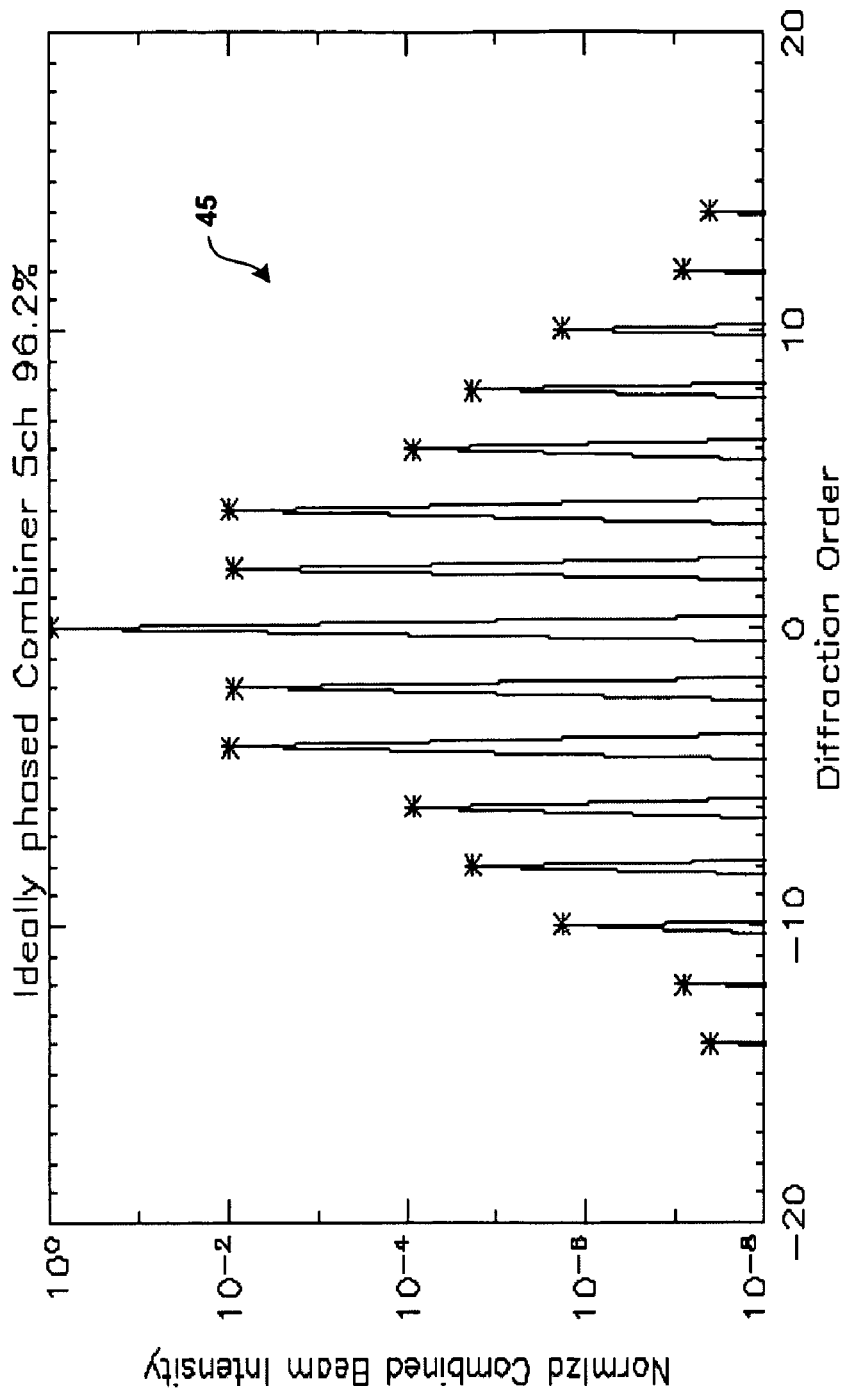
FIG. 6 is a logarithmic plot of normalized intensities vs. diffraction orders resulting when the DOE of FIG. 4 is used to combine five ideally phased beams.

Coherent diffractive beam combining is achieved by using the DOE "in reverse". That is, if (in the foregoing example) the five input beams are properly phased and pointed and have equal power, the DOE is designed to provide optimal efficiency of combination of about 96%. This efficiency is shown by the normalized intensities 45 of the diffracted orders plotted in FIG. 6. In this example, the desired output beam is the $0^{th}$ diffracted order, which has an intensity about two orders of magnitude higher than the intensity of any other diffraction order, as shown. In another embodiment, when the relative powers of the input beams are adjusted to match the distribution of FIG. 5, the DOE may provide an optimal combination efficiency equal to the splitting efficiency of about 98%.

Figure 7:
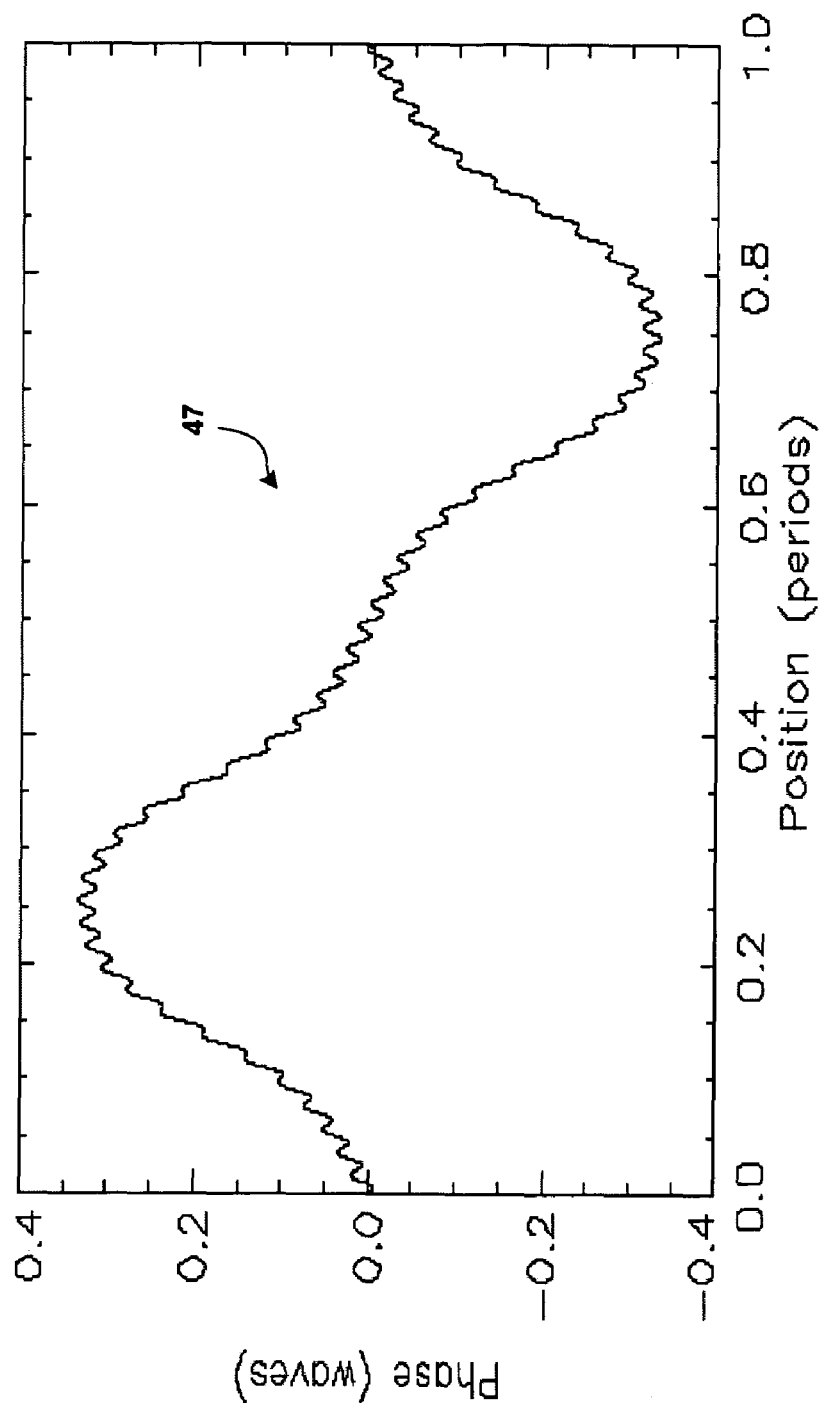
FIG. 7 is a plot of another example of a periodic phase pattern in a five-beam combiner DOE having an added sinusoidal sampling grating.
Figure 8:
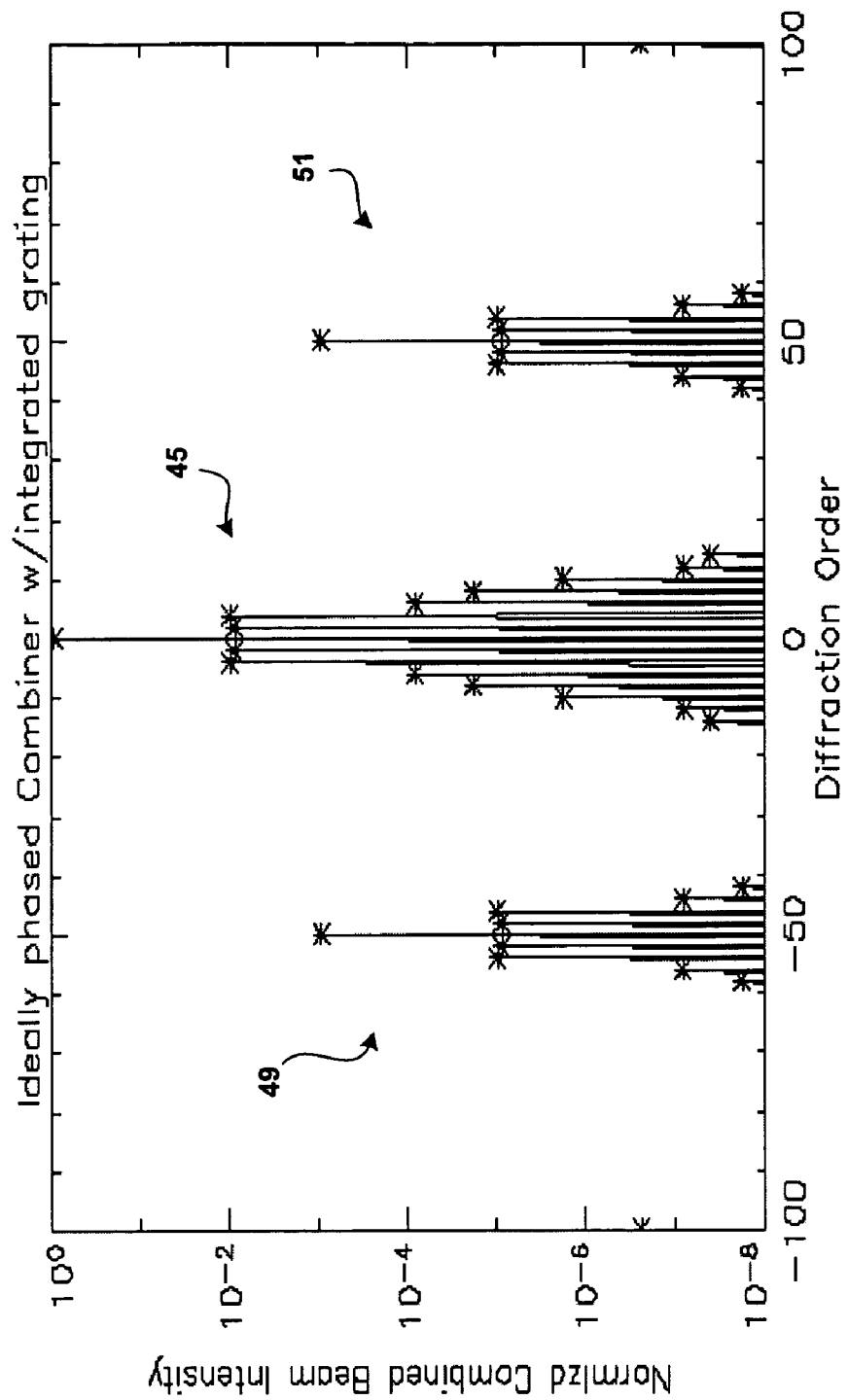
FIG. 8 is a logarithmic plot of normalized intensities of diffraction orders resulting when the DOE of FIG. 7 is used to combine five ideally phased beams.

FIGS. 7-8 illustrate the sampling capability of a DOE. In one embodiment, the design of the five-beam combiner DOE of FIGS. 4-5 may be modified by adding a weak, short-period sinusoidal sampling grating. The peak-to-peak phase value of this particular sampling grating is selected as $\frac{1}{50}^{th}$ of a wave. A plot of the phase of the modified DOE with sampling grating is shown in FIG. 7. Here, the resulting phase pattern 47 appears as the short-period sinusoid superimposed on periodic phase pattern 43. When properly aligned to the modified DOE, ideally phased input beams are diffracted to produce the output shown in FIG. 8. Note that in FIG. 8, the central group of diffraction order intensities 45 centered about the $0^{th}$ order is the same relative distribution of intensities shown in the plot of FIG. 5. The left-hand diffraction order intensities 49, and right-hand diffraction order intensities 51, are centered about the $-50^{th}$ and $+50^{th}$ orders, respectively. Each of these intensity groups 49 and 51 provides a low-power representation of the distribution of intensities 45.

The DOE embodiment illustrated in FIGS. 7-8 has sampling grating grooves situated in parallel to the main grooves and therefore the sampled beam is in the same plane as the fiber array and spurious diffracted output beams. The period of the sampling grating in this example is taken to be $\frac{1}{50}^{th}$ of the DOE combiner period, and thus the beam sample is diffracted at an angle corresponding to the $\pm 50^{th}$ diffracted order of the combiner. As shown in FIG. 8, the sampled beam diffraction order intensities 49 and 51 are well separated from the spurious diffracted orders of the DOE combiner function.

Skilled artisans should recognize that many other DOE embodiments are possible, wherein a sampling grating comprising a set of grooves is applied in any direction relative to the DOE combiner function such that the sampled beam departs the DOE in any convenient direction.

In the foregoing example, the sampling grating phase depth is selected to be $\frac{1}{50}^{th}$ of a wave. As a result the sample intensity in either of the two $\pm 50^{th}$ sampled orders is approximately $1 \times 10^{-3}$ of the main ($0^{th}$ order) output beam. As shown in FIG. 8, each of the primary sampled $\pm 50^{th}$ orders provides an identical low power copy of the fully combined beam. In general, a weak sinusoidal phase grating can be adjusted according to a desired sample fraction of approximately $2.5\phi^2$, where $\phi^2$ is the peak-to-peak phase amplitude of the grating measured in waves. The sinusoidal shape of a sampling grating leads to equal sampled beam intensities in both $\pm 50^{th}$ orders. In other embodiments of a DOE sampling grating, a "blazed" (i.e. more triangular) shape can be used to preferentially diffract light primarily into one of these orders, as is well understood in the grating art. However, for very high power applications, it may be necessary for the surface of the DOE to be etched more smoothly without any precipitous jumps. This advantageously allows the etched DOE to be over-coated with a very high reflectivity, low-absorption multilayer stack that conforms well and preserves the precise surface shape of the DOE.

It is noted that the sampling grating and the DOE combiner itself are dispersive, i.e. they have diffracted order angles that are wavelength dependent. At normal incidence, the dispersion for a grating with period P is given by $$d\theta/d\lambda = m/P \cos \theta = \tan \theta/\lambda \quad (2)$$

Figure 9:
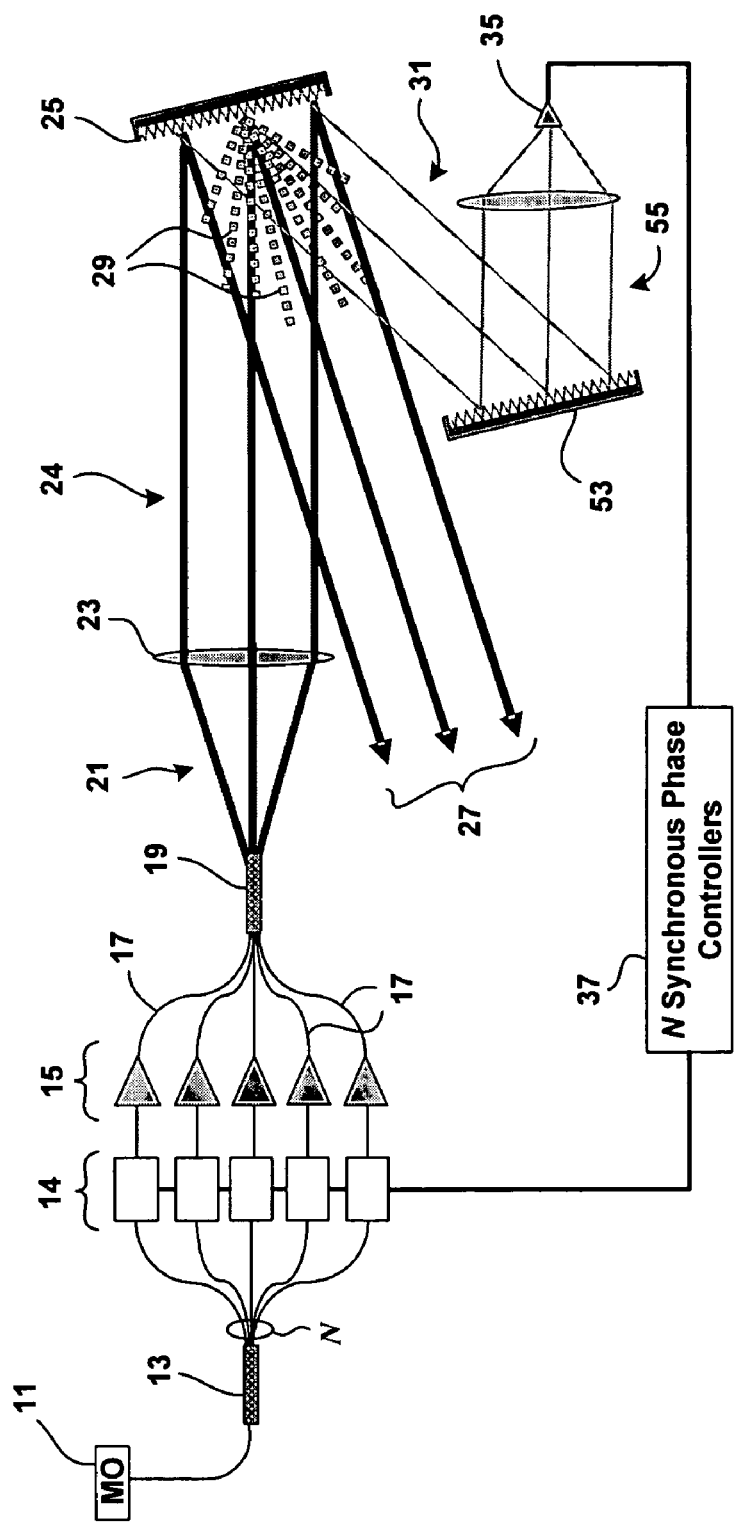
FIG. 9 is a block diagram of another embodiment of a system according to the invention which includes a compensation grating for removing angular dispersion from a sampled beam.

Thus, a smaller period or a larger diffraction angle leads to larger dispersion. Depending on the bandwidth requirements for the system this may lead to a limitation on diffraction angle. FIG. 9 illustrates another embodiment of a system according to the invention that compensates for a sample beam having such a large dispersion. In this embodiment, a compensation grating 53 is positioned in the path of the diffracted sample 31. Compensation grating 53 is precisely matched to cancel the dispersion of the DOE sampling grating and direct a collimated beam 55 to phase detection stage 35.

It should be appreciated that many advantages arise from combining beam splitting and beam sampling functions into a single optical element. A system employing such an optic minimizes the total number of elements in the optical path. This simplifies system construction and alignment of the elements within the system. Having fewer optical elements in the system also reduces the probability of introducing distortion in the optical signal, which leads to better combination efficiency and higher intensity in the output beam.

In high-power laser systems, the integrated DOE combiner and sampler also simplifies heat removal. In one respect, heat removal is simplified because the heat energy accumulates on fewer elements. In another respect, the reflective characteristic of the DOE combiner/sampler allows heat transfer through the non-reflective side. In large scale systems, a weight reduction advantage is also achieved through component minimization.

The invention has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the subject invention. Accordingly, the invention is not to be restricted, except in light of the appended claims and their equivalents.

What is claimed is:

1. A system for combining a plurality of light beams into a single coherent beam, comprising:
   a source for transmitting a plurality of light beams at a common wavelength;
   a phase modulation stage for locking phases of the light beams according to phase correction signals;
   a diffractive optical element combining the light beams into a coherent output beam and a coherent sample beam;
   a phase detection stage for detecting the phases of constituent light beams in the coherent sample beam; and
   a means for deriving the correction signals from the detected phases.

2. The system of claim 1 wherein the coherent output beam has a maximum intensity along a 0th diffraction order of the diffractive optical element.

3. The system of claim 1 further comprising an array of fibers for directing the light beams from the phase modulation stage to the diffractive optical element.

4. The system of claim 1 wherein the diffractive optical element focuses the coherent sample beam.

5. The system of claim 1 wherein the diffractive optical element collimates the light beams directed from the array.

6. The system of claim 1 wherein the diffractive optical element comprises a primarily reflective optical element.

7. The system of claim 1 further comprising an amplification stage for amplifying the phase-locked beams to a desired power level.

8. The system of claim 1 wherein the diffractive optical element separates all diffracted orders of the coherent sample beam from all diffracted orders of the coherent output beam.

9. The system of claim 8 wherein relative intensities of the diffracted orders of the coherent sample beam comprise a low power representation of relative intensities of the diffracted orders of the coherent output beam.

10. A system for combining a plurality of laser beams into a coherent laser beam, comprising:
    a source for transmitting a plurality of laser beams at a common wavelength;
    a phase modulation stage for synchronizing phases of the laser beams according to phase correction signals;
    an array of fibers directing the laser beams;
    a diffractive optical element combining the laser beams from the array of fibers into a coherent laser beam, the diffractive optical element having a short periodic sampling grating for diffracting a coherent sample beam representing relative intensities of all diffracted orders of the coherent laser beam;
    one or more phase detectors for detecting phases of constituent beams in the coherent sample beam; and
    a phase controller for deriving the phase correction signals from the detected phases and sending the phase correction signals to the phase modulation stage.

11. A method for combining a plurality of light beams into a single coherent beam, comprising:
    transmitting a plurality of light beams at a common wavelength;
    synchronizing phases of the light beams according to phase correction signals derived from the coherent beam;
    combining the light beams by diffraction into a coherent output beam and a coherent sample beam;
    detecting the phases of constituent light beams in the coherent sample beam; and
    deriving phase correction signals from the detected phases.

12. The method of claim 11 further comprising, prior to the combining step, directing the light beams through a fiber array to a diffractive optical element.

13. The method of claim 12 further comprising collimating the light beams directed through the fiber array by means of the diffractive optical element.

14. The method of claim 11 wherein the coherent output beam has a maximum intensity along the 0th diffraction order of a diffractive optical element.

15. The method of claim 11 further comprising focusing the coherent sample beam by means of a diffractive optical element.

16. The method of claim 11 further comprising combining the light beams into a coherent output beam and a coherent sample beam by means of a primarily reflective diffractive optical element.

17. The method of claim 11 further comprising, after the synchronizing step, amplifying the light beams to a desired power level.

18. The method of claim 11 further comprising combining the light beams by means of a diffractive optical element separating all diffracted orders of the coherent sample beam from all diffracted orders of the coherent output beam.

19. The method of claim 18 wherein the distribution of intensities of the diffracted orders of the coherent sample beam comprises a low power representation of the distribution of intensities of the diffracted orders of the coherent output beam.

20. The method of claim 11 further comprising combining the light beams by means of a diffractive optical element into a coherent output beam such that one diffracted order has an intensity at least two orders of magnitude higher than the intensity of any other diffracted order.

* * * * *